(12) United States Patent
Kim

(10) Patent No.: US 9,257,860 B2
(45) Date of Patent: Feb. 9, 2016

(54) BATTERY PACK, CELL BALANCING METHOD OF THE SAME, AND ENERGY STORAGE SYSTEM INCLUDING THE BATTERY PACK

(71) Applicant: SAMSUNG SDI CO., LTD., Yongin-si, Gyeonggi-do (KR)

(72) Inventor: Meen-Suk Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 170 days.

(21) Appl. No.: 13/949,536

(22) Filed: Jul. 24, 2013

(65) Prior Publication Data

US 2014/0042977 A1 Feb. 13, 2014

Related U.S. Application Data

(60) Provisional application No. 61/681,307, filed on Aug. 9, 2012.

(51) Int. Cl.
*H02J 7/00* (2006.01)

(52) U.S. Cl.
CPC ............. *H02J 7/0068* (2013.01); *H02J 7/0016* (2013.01)

(58) Field of Classification Search
CPC .............................. H02J 7/0068; H02J 7/0016
See application file for complete search history.

(56) References Cited

U.S. PATENT DOCUMENTS

| 2006/0022646 A1 | 2/2006 | Moore et al. |
| 2006/0043934 A1 | 3/2006 | Sugimoto |
| 2009/0096419 A1* | 4/2009 | White et al. .................. 320/118 |
| 2011/0140665 A1* | 6/2011 | Tamezane et al. ............ 320/118 |
| 2011/0318616 A1 | 12/2011 | Kim et al. |
| 2012/0094151 A1 | 4/2012 | Kim |
| 2013/0127423 A1* | 5/2013 | Liang et al. ................... 320/136 |

FOREIGN PATENT DOCUMENTS

| KR | 10-2008-0010698 A | 2/2008 |
| KR | 10-2011-0139424 A | 12/2011 |
| KR | 10-2012-0016993 A | 2/2012 |

OTHER PUBLICATIONS

Extended European Search Report dated Dec. 9, 2013.
European Office action dated Nov. 11, 2014 for EP 13 155 260.0; Kim.

* cited by examiner

*Primary Examiner* — Nha Nguyen
(74) *Attorney, Agent, or Firm* — Lee & Morse, P.C.

(57) ABSTRACT

A method and battery management system performing cell balancing for a battery pack includes measuring a voltage of each of a plurality of battery cells in a battery pack, selecting one of the plurality of battery cells as a battery cell subject to cell balancing based on the measured voltages, selecting one of a plurality of resistors as a resistor on which cell balancing is performed, and outputting the voltage of the battery cell subject to cell balancing from a multiplexer that receives the voltage of each of the plurality of battery cells to the resistor on which cell balancing is performed.

18 Claims, 5 Drawing Sheets

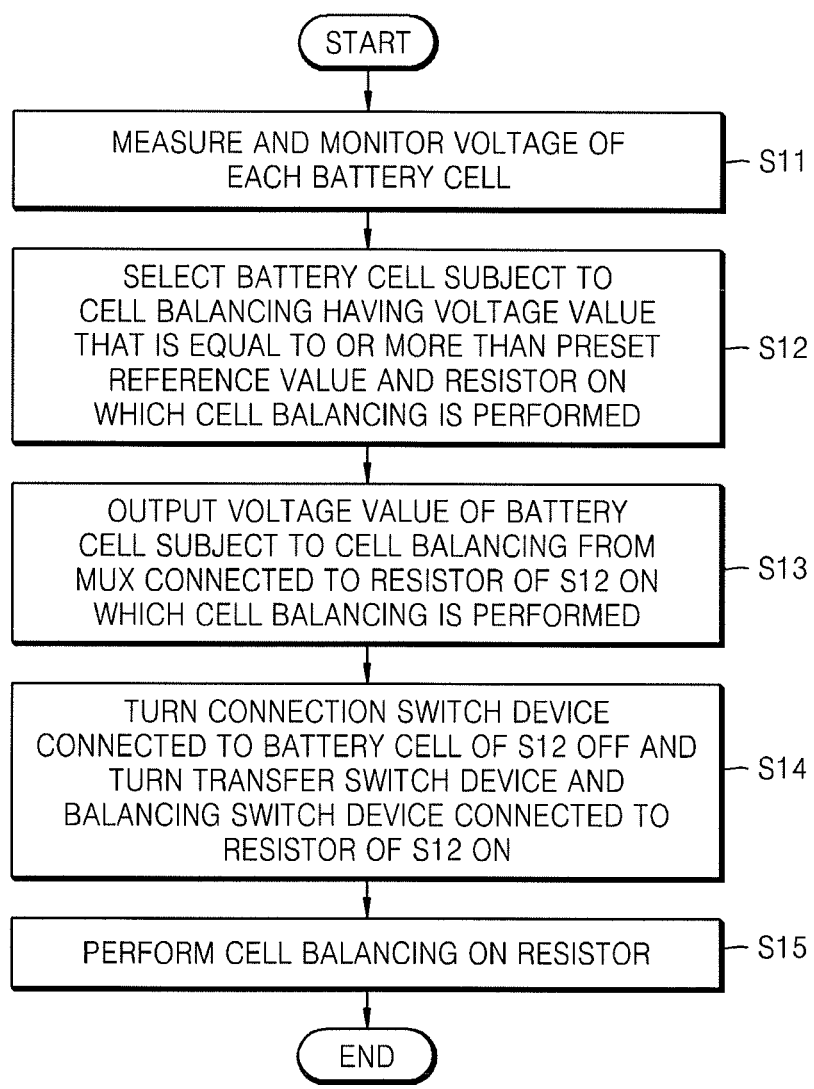

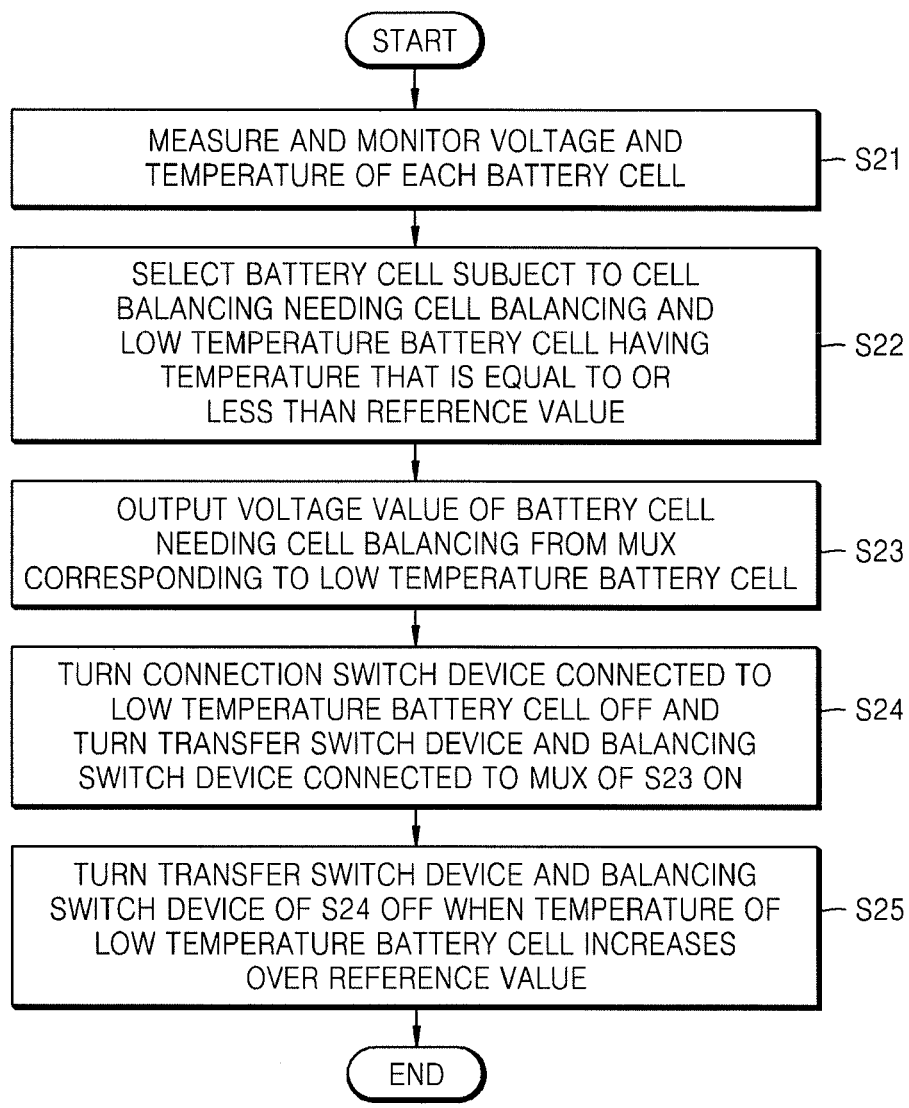

BATTERY PACK, CELL BALANCING METHOD OF THE SAME, AND ENERGY STORAGE SYSTEM INCLUDING THE BATTERY PACK

CROSS-REFERENCE TO RELATED APPLICATION

The present application claims priority under 35 U.S.C. §119(e) to U.S. Provisional Application No. 61/681,307, filed on Aug. 9, 2012 and entitled: "BATTERY PACK, CELL BALANCING METHOD OF THE SAME, AND ENERGY STORAGE SYSTEM INCLUDING THE BATTERY PACK," which is incorporated herein by reference in its entirety.

BACKGROUND

1. Field

Embodiments relate to a method of measuring a voltage of a battery pack and an energy storage system including the battery pack.

2. Description of the Related Art

As environmental destruction and resource depletion become problematic, a system for efficiently storing power and using stored power increasingly draws attention. Also, renewable energy that does not generate pollution in a process of generating power is of interest. An energy storage system is a system to link renewable energy, a power storing battery, and conventional system power, and much research and development have been made corresponding to a change in today's environment.

In the energy storage system, efficient management of a battery is an important factor. A battery needs to be managed for various factors such as charge, discharge, cell balancing, etc. The life of a battery may be extended through the efficient management thereof. Also, power may be stably supplied to a load.

SUMMARY

Embodiments are directed to a method for performing cell balancing for a battery pack, the method including measuring a voltage of each of a plurality of battery cells in a battery pack, selecting one of the plurality of battery cells as a battery cell subject to cell balancing based on the measured voltages, selecting one of a plurality of resistors as a resistor on which cell balancing is performed, and outputting the voltage of the battery cell subject to cell balancing from a multiplexer that receives the voltage of each of the plurality of battery cells to the resistor on which cell balancing is performed.

The method may include turning to an off state a connection switch device that is connected between the resistor on which cell balancing is performed and a corresponding one of the plurality of battery cells, and turning to an on state each of a transfer switch device and a balancing switch device that are connected between the resistor on which cell balancing is performed and the multiplexer.

The voltage of the battery cell subject to cell balancing may pass through the transfer switch device and the balancing switch device, to reach the resistor on which cell balancing is performed.

The resistor on which cell balancing is performed may be selected based on monitoring information about the plurality of battery cells and each of the plurality of resistors corresponds to one of the plurality of battery cells, the voltage of the battery cell subject to cell balancing being equal to or greater than a reference voltage value.

The multiplexer having the voltage of each of the plurality of battery cells applied thereto is a selected multiplexer from among a plurality of multiplexers, the selected multiplexer may be selected based on the selecting of the resistor on which cell balancing is performed and independently of the selection of the battery cell subject to cell balancing, and outputting the voltage of the battery cell subject to cell balancing includes sending a selection signal to the selected multiplexer.

The method may include measuring a temperature of each of the plurality of battery cells, and selecting one of the plurality of battery cells as a low temperature battery cell, the resistor on which cell balancing is performed being selected based on proximity to the low temperature battery cell.

Each of the plurality of resistors may correspond to one of the plurality of battery cells such that the resistor on which cell balancing is performed corresponds to the low temperature battery cell.

The method may include turning to an off state a connection switch device connected between the resistor on which cell balancing is performed and a corresponding one of the plurality of battery cells, and turning to an on state each of a transfer switch device and a balancing switch device connected between the resistor on which cell balancing is performed and the multiplexer connected to the resistor on which cell balancing is performed such that the voltage of the battery cell subject to cell balancing is output to the resistor corresponding to the low temperature battery cell.

The method may further include turning each of the transfer switch device and the balancing switch device to an off state when the temperature of the low temperature battery cell is greater than a reference temperature value.

Embodiments are directed to providing an energy storage system including a battery pack including a plurality of battery cells and a battery management system connected to the battery pack. The battery management system may include a measurement circuit that measures a voltage of each of the battery cells, a balancing circuit that includes a plurality of resistors, a selector that selects one of the plurality of battery cells as a battery cell subject to cell balancing and that selects one of the plurality of resistors as a resistor on which cell balancing is performed, and a voltage transfer circuit that includes a multiplexer connected to the resistor on which cell balancing is performed, the multiplexer having inputs for the voltage of each of the battery cells such that the voltage of the battery cell subject to cell balancing is output from the multiplexer to the resistor on which cell balancing is performed.

The multiplexer in the voltage transfer circuit may be one of a plurality of multiplexers such that each of the resistors in the balancing circuit corresponds to and is connected to one of the plurality of multiplexers in the voltage transfer circuit.

The battery management system may include a plurality of connection switch devices, each connection switch device being connected between one of the plurality of resistors and a corresponding one of the plurality of battery cells, the balancing circuit includes a plurality of balancing switch devices, each balancing switch device being connected between one of the plurality of resistors and a corresponding one of the plurality of multiplexers, and the voltage transfer circuit includes a plurality of transfer switch devices, each of the transfer switch devices being connected between one of the plurality of multiplexers and the balancing circuit.

The battery management system may include a switch device controller that controls the plurality of connection switch devices, the plurality of balancing switch devices, and the plurality of transfer switch devices, and, when the voltage of the battery cell subject to cell balancing is output from the multiplexer that corresponds to the resistor on which cell balancing is performed, one of the plurality of connection switch devices that is between the resistor on which cell balancing is performed and the corresponding one of the plurality of battery cells is in an off state.

When the voltage of the battery cell subject to cell balancing is output from the multiplexer that corresponds to the resistor on which cell balancing is performed, one of the plurality of transfer switch devices and one of the plurality of balancing switch devices between the resistor on which cell balancing is performed and the corresponding one of the plurality of battery cells may be in an on state.

The multiplexer in the voltage transfer circuit may be one of a plurality of multiplexers such that each of the resistors corresponds to one of the plurality of multiplexers and corresponds to one of the plurality of battery cells, and the battery management system includes a multiplexer controller that controls the plurality of multiplexers based on selection by the selector.

The multiplexer controller may determine which of the plurality of multiplexers outputs the voltage of the battery cell subject to cell balancing based on which of the plurality of resistors is selected by the selector as the resistor on which cell balancing is performed.

The measurement circuit measures a temperature of each of the battery cells, the selector may select one of the plurality of battery cells as a low temperature battery cell, and the multiplexer controller controls one of the plurality of multiplexers corresponding to the low temperature battery cell to output the voltage of the battery cell subject to cell balancing.

The measurement circuit measures a temperature of each of the battery cells, and the selector may select one of the plurality of battery cells as a low temperature battery cell, the low temperature battery cell being connectable to the resistor on which cell balancing is performed via a connection switch device.

The battery management system may include a monitor that receives voltage information that includes the voltage of each of the battery cells and temperature information that includes the temperature of each of the battery cells from the measurement circuit, and the monitor provides the information to the selector, the selector independently selects the battery cell subject to cell balancing based on the voltage information and selects the resistor on which cell balancing is performed based on the temperature information.

The battery management system include a monitor that receives voltage information that includes the voltage of each of the battery cells, and the monitor provides the voltage information to the selector, the selector selects the battery cell subject to cell balancing based on the voltage information and selects the resistor on which cell balancing is performed independently of the voltage information.

BRIEF DESCRIPTION OF THE DRAWINGS

Features will become apparent to those of ordinary skill in the art by describing in detail exemplary embodiments with reference to the attached drawings in which:

FIG. 4 illustrates a flowchart according to a first embodiment.

FIG. 5 illustrates a flowchart according to a second embodiment.

DETAILED DESCRIPTION

Figure 1:
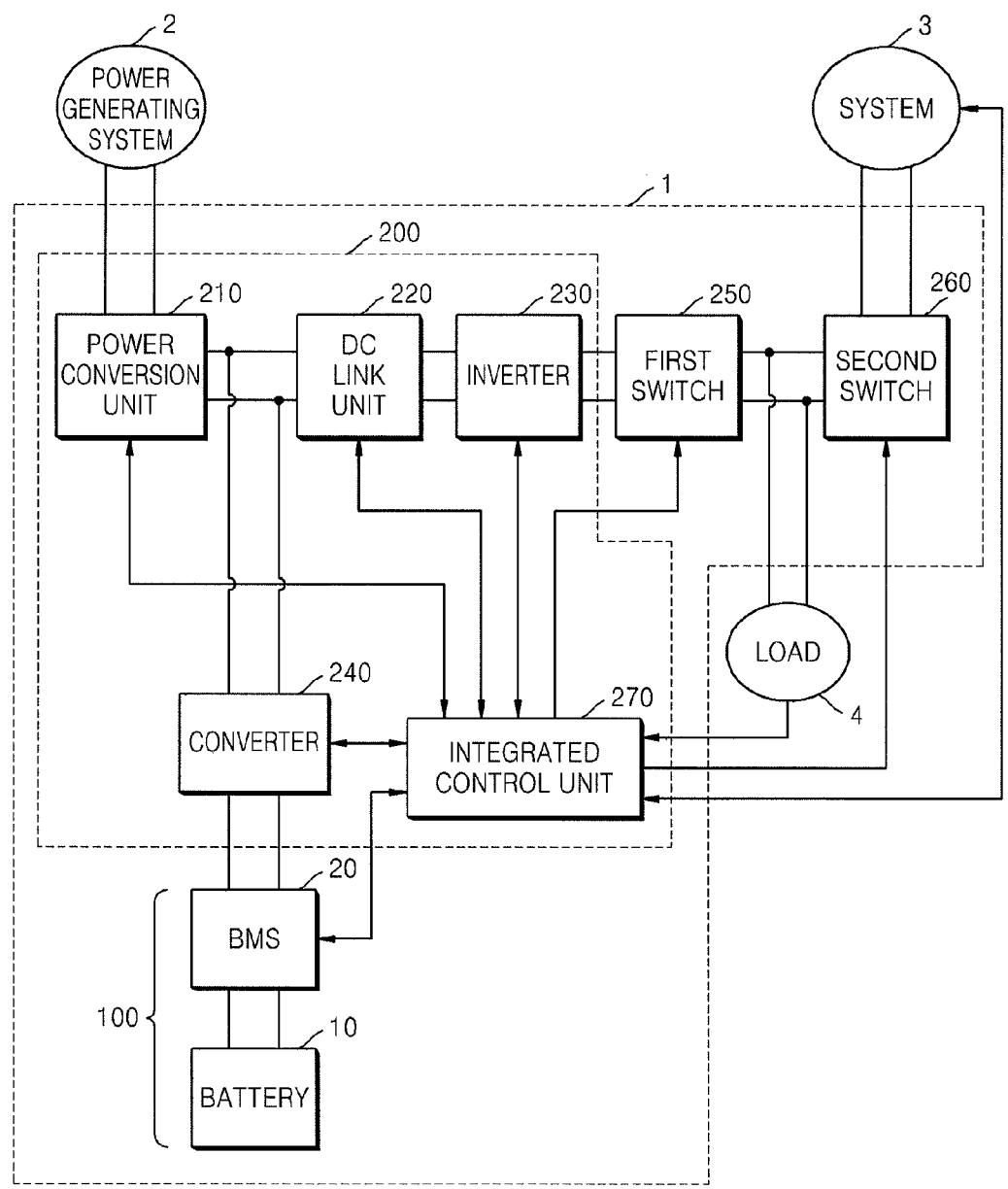
FIG. 1 illustrates a block diagram of an energy storage system according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Although various embodiments of are different from each other, it should be understood that they do not need to be exclusive to each other. Like reference numerals in the drawings denote like elements, and thus their description will be omitted.

FIG. 1 illustrates a block diagram of an energy storage system 1 according to an embodiment. Referring to FIG. 1, the energy storage system 1 supplies power to a load 4 in link with a power generating system 2, and a grid 3.

The power generating system 2 is a system to generate power by using an energy source. The power generating system 2 supplies generated power to the energy storage system 1. The power generating system 2 may be a solar photovoltaic power system, a wind power system, a tidal power system, etc. The power generating system 2 may include any power system capable of generating power, including by using renewable energy, e.g., solar heat, ground heat, etc.

The grid 3 includes a power plant, a power substation, a power cable, etc. When the grid 3 is in a normal state, the grid 3 supplies power to the energy storage system 1 so that the power may be supplied to the load 4 and/or a battery 10, and receives power from the energy storage system 1. When the grid 3 is in an abnormal state, the power supply from the grid 3 to the energy storage system 1 is discontinued and the power supply from the energy storage system 1 to the grid 3 is also discontinued.

The load 4 consumes the power generated by the power generating system 2, the power stored in the battery 10, or the power supplied from the grid 3. Home or factory may be an example of the load 4.

The energy storage system 1 may store the power generated by the power generating system 2 in the battery 10 and supply generated power to the grid 3. Also, the energy storage system 1 may supply the power stored in the battery 10 to the grid 3 or the power supplied from the grid 3 to the battery 10. Also, when the grid 3 is in an abnormal state, for example, blackout occurs, the energy storage system 1 may perform an uninterruptible power supply (UPS) operation to supply power to the load 4. Also, when the grid 3 is in a normal state, the energy storage system 1 may supply the power generated by the power generating system 2 or the power stored in the battery 10 to the load 4.

The energy storage system 1 includes a power control system (PCS) 200 for controlling conversion of power, a first switch 250, a second switch 260, a battery management system 20 (hereinafter, referred to as BMS 20), and the battery 10.

The PCS 200 converts the power of the power generating system 2, the grid 3, and the battery 10 to appropriated power and supplies the power to where the power is needed. The PCS 200 includes a power conversion unit 210, a DC link unit 220, an inverter 230, a converter 240, and an integrated control unit 270.

The power conversion unit 210 is connected between the power generating system 2 and the DC link unit 220. The power conversion unit 210 transmits the power generated by the power generating system 2 to the DC link unit 220 by converting an output voltage to a DC link voltage. In particular, when the power generating system 2 generates power from solar light, the power conversion unit 210 may include a maximum power point tracking (MPPT) converter for performing MPPT control to obtain the maximum power generated by the power generating system 2 according to a change in solar irradiance, temperature, etc.

An amount of a DC link voltage may become unstable due to an instantaneous voltage drop in the power generating system 2 or the grid 3 or generation of a peak load in the load 4. However, the DC link voltage needs to be stabilized for normal operations of the converter 240 and the inverter 230. The DC link unit 220 may include, for example, a capacitor having a large capacity, for the stabilization of a DC link voltage. The DC link unit 220 is connected between the power conversion unit 210 and the inverter 230, and maintains a DC link voltage constant.

The inverter 230 is a power converter that is connected between the DC link unit 220 and the first switch 250. The inverter 230 may include an inverter for converting a DC link voltage output from the power generating system 2 and/or the battery 10 to an AC voltage of the grid 3 and outputs the converted voltage in a discharge mode. Also, the inverter 230 may include a rectifier circuit for rectifying the AC voltage of the grid 3, converting the AC voltage to a DC link voltage, and outputting the converted voltage, to store the power of the grid 3 in the battery 10 in a charge mode. The inverter 230 may include a bidirectional inverter or a plurality of inverting circuits.

The inverter 230 may include a filter for removing a harmonic wave from the AC voltage output to the grid 3. Also, the inverter 230 may include a PLL circuit for synchronizing a phase of the AC voltage output from the inverter 230 and a phase of the AC voltage of the grid 3 in order to restrict generation of an invalid power. In addition, the inverter 230 may perform functions of limiting a voltage regulation range, improving a power factor, removing a DC component, protecting a transient phenomenon, etc.

The converter 240 is a power converter connected between the DC link unit 220 and the battery 10. The converter 240 includes a converter for DC-DC converting the power stored in the battery 10 to a voltage level needed by the inverter 230, that is, a DC link voltage, and outputting the converted power, in a discharge mode. Also, the converter 240 includes a converter for DC-DC converting the power output from the power conversion unit 210 or a voltage of the power output from the inverter 230 to a voltage level needed by the battery 10, that is, a charge voltage, in a charge mode. The converter 240 may include a bidirectional converter or a plurality of converting circuits.

The integrated control unit 270 monitors states of the power generating system 2, the grid 3, the battery 10, and the load 4 and controls the power conversion unit 210, the inverter 230, the converter 240, the first switch 250, and the second switch 260, and the BMS 20 according to a result of the monitoring. Items that the integrated control unit 270 monitors may include whether blackout occurs in the grid 3 or whether the power generating system 2 generates power. Also, the integrated control unit 270 may monitor a power generation amount of the power generating system 2, a charge state of the battery 10, a power consumption amount of the load 4, time, etc.

The first switch 250 and the second switch 260 are serially connected between the inverter 230 and the grid 3, and control flow of current between the power generating system 2 and the grid 3 by performing on/off operations according to control of the integrated control unit 270. The on/off of the first switch 250 and the second switch 260 may be determined according to the states of the power generating system 2, the grid 3, and the battery 10. For example, when an amount of power needed by the load 4 is large, both of the first 250 and the second switch 260 are set to an ON state. Thus, the power of the power generating system 2, the grid 3, and the battery 10 are supplied to the load 4. In contrast, when blackout occurs in the grid 3, the second switch 260 is set to be an OFF state and the first switch 250 is set to an ON state. Accordingly, the power from the power generating system 2 or the battery 10 may be supplied to the load 4 and, thus, power supplied to the load 4 may be prevented from flowing toward the grid 3. Thus, operators working on a power cable of the grid 3 may avoid electric shocks.

The BMS 20 is connected to the battery 10 and controls charge and discharge operations of the battery 10 according to the control of the integrated control unit 270. The BMS 20 may perform an overcharge protection function, an overdischarge protection function, an overcurrent protection function, an overvoltage protection function, an overheat protection function, a cell balancing function, etc., to protect the battery 10. To this end, the BMS 20 may monitor a voltage, current, a temperature, a remaining power amount, lifespan, a charge state, etc., of the battery 10 and apply a result of the monitoring to the integrated control unit 270.

In particular, the BMS 20 may selectively connect a battery cell subject to cell balancing and a resistor on which cell balancing is performed by using a switch device and a selection circuit when the cell balancing of the battery 10 is performed. Also, the temperature of a low temperature battery cell may be increased with heat generated during discharge by selecting a resistor close to the low temperature battery cell as the resistor on which cell balancing is performed. In this regard, a detailed operation of the BMS 20 will be described later.

The battery 10 receives and stores the power generated by the power generating system 2 and the power of the grid 3, and supplies the power stored in the load 4 or the grid 3. The number of batteries may be determined according to the power capacity, design conditions, etc., needed by the energy storage system 1. For example, when the consumption power of the load 4 is large, a plurality of batteries may be provided as the load 4, and when the consumption power of the load 4 is small, only one battery may be provided as the load 4.

Figure 2:
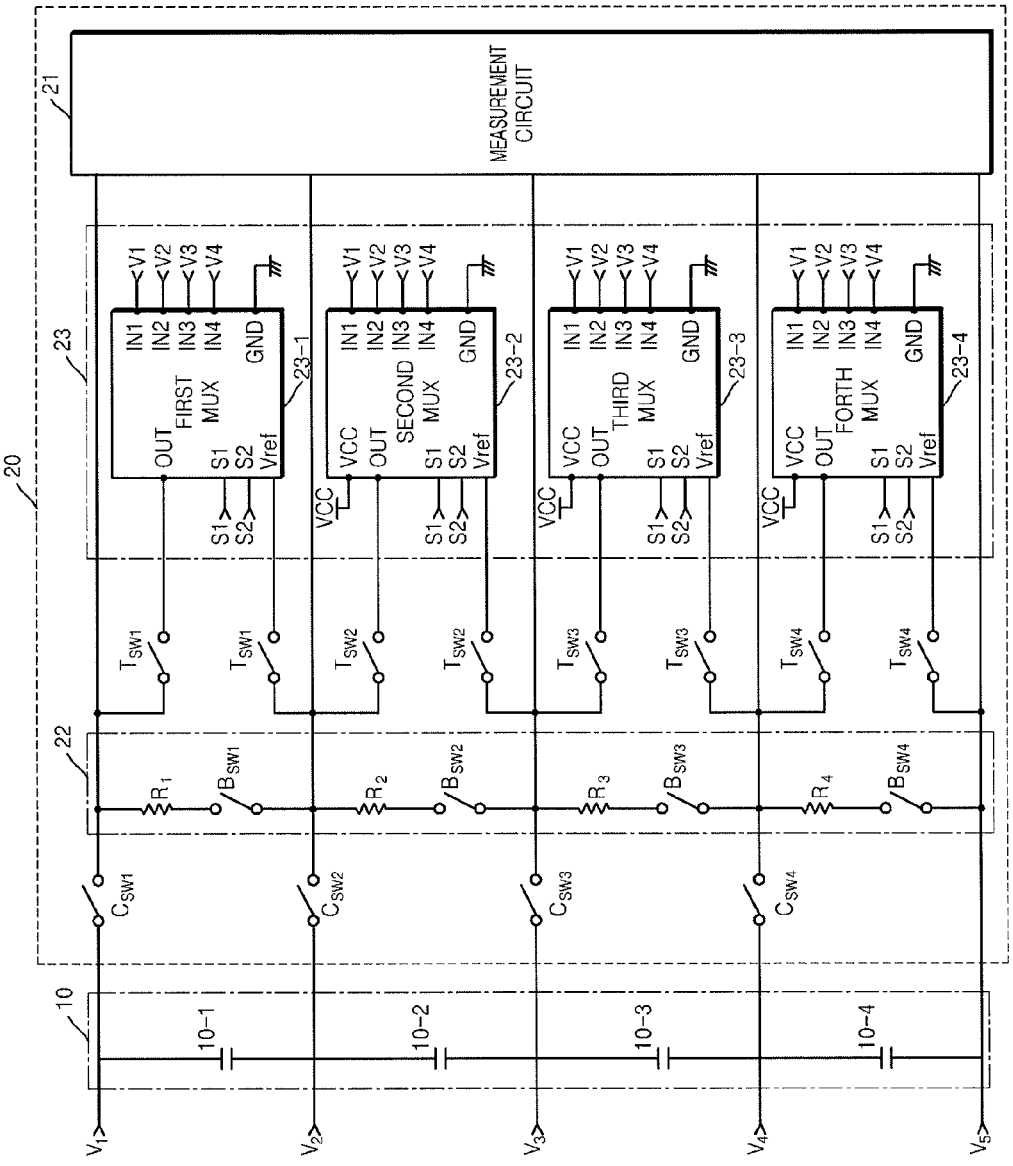
FIG. 2 illustrates a schematic circuit diagram of a circuit of a battery pack according to an embodiment.

FIG. 2 is a circuit diagram schematically illustrating a circuit of a battery pack according to an embodiment. As described above, the battery pack 100 includes the BMS 20. Referring to FIG. 2, a circuit of the BMS 20 includes a measurement circuit 21, a balancing circuit 22, a plurality of switch devices, and a voltage transfer circuit 23.

In the description with reference to FIG. 2, "a resistor, a switch device, and a MUX corresponding to a particular battery cell" may respectively indicate a resistor, a switch device, and a MUX close to a particular battery. For example, a resistor corresponding to a first battery cell 10-1 is a first resistor R1 and a balancing switch device corresponding to the first battery cell 10-1 is a first balancing switch device Bsw1. Likewise, a MUX corresponding to a second battery cell 10-2 is a second MUX 23-2.

First, the battery 10 according to the present embodiment may include a plurality of battery cells. In an embodiment of FIG. 2, the battery 10 includes four battery cells 10-1, 10-2, 10-3, and 10-4.

Also, both ends of the battery 10 are connected to a terminal unit (not shown). The terminal unit includes a positive terminal and a negative terminal. The power stored in the battery 10 may be supplied to the outside via the terminal unit. Also, the battery 10 may be charged as external power is supplied to the battery 10 via the terminal unit. When the battery 10 is used for a portable apparatus, the terminal unit may be connected to the portable apparatus or a charger. Alternatively, when the battery 10 is used for the energy storage system 1, the terminal unit may be connected to a converter 14 for converting power or another battery tray.

Although FIG. 2 illustrates that the battery 10 includes a plurality of battery cells 10-1, 10-2, 10-3, and 10-4 that are serially connected as an embodiment, the battery 10 according to another embodiment may include a plurality of battery modules connected serially or serially and parallelly and each of the battery modules may include at least one battery cell. When a plurality of battery cells are included in a battery module, the battery cells in the battery module may be connected serially and/or parallelly. The battery cell may be a rechargeable secondary battery.

Among the various embodiments, FIG. 2 illustrates a case in which the battery cells 10-1, 10-2, 10-3, and 10-4 are serially connected. However, this is merely for convenience of explanation, and embodiments are not limited to the number of battery modules constituting a battery and the number of battery cells constituting a battery module.

Referring to FIG. 2, the battery 10 includes four battery cells 10-1, 10-2, 10-3, and 10-4 and both ends of each of the battery cells 10-1, 10-2, 10-3, and 10-4 are connected to the measurement circuit 21. The measurement circuit 21 measures a state of a battery such as a voltage, a temperature, etc. The measurement circuit 21 may include a thermometer or a capacitor to measure the state of each battery cell. Also, the measurement circuit 21 may include a switch device to control a measurement time when a temperature and a voltage of a battery is measured.

In general, cell balancing is to prevent biased use of a voltage of a cell of a plurality of cells by discharging a high voltage battery by using a resistor or resistors to prevent generation of a voltage difference between cells. Thus, the measurement circuit 21 obtains a voltage measurement value needed to determine whether a certain cell is suitable as a target of cell balancing by measuring a voltage of each battery cell. The measurement circuit 21 detects a particular battery cell as a target battery cell of cell balancing when a voltage value is equal to or more than a preset value.

In an embodiment to be described below, cell balancing is performed by selectively applying a voltage of a battery cell subject to cell balancing to one of a plurality of resistors by using a switch device and a voltage transfer circuit. In particular, in an embodiment, cell balancing is performed by using a resistor close to a low temperature battery cell so that a temperature of the low temperature battery cell is increased.

Temperatures of the battery cells 10-1, 10-2, 10-3, and 10-4 have a significant impact on stable operation of a battery pack. In order for a battery pack to stably operate, not only should the entire battery pack operate within an appropriate temperature range, but also a temperature of each of the battery cells 10-1, 10-2, 10-3, and 10-4 should operate within an appropriate temperature range. Accordingly, the measurement circuit 21 includes a thermometer for measuring a temperature of each battery cell, e.g., may measure a temperature of each battery cell real time or in a predetermined time interval. The measurement circuit 21 may determine a battery cell having a temperature equal to or less than a preset reference value as a low temperature battery cell.

According to the present embodiment, a voltage of a battery cell needing cell balancing is output to a voltage transfer circuit 23 corresponding to a low temperature battery cell by referring to a voltage value of each battery cell measured by the measurement circuit 21, and cell balancing may be performed by using a discharge resistor corresponding to the low temperature battery cell so that a temperature of the low temperature battery cell may be increased, which is described below in detail.

Next, the balancing circuit 22 discharges a voltage of the battery cell subject to cell balancing by using resistors R1, R2, R3, and R4 to achieve a voltage balance between the battery cells 10-1, 10-2, 10-3, and 10-4. Also, the balancing circuit 22 increases a temperature of a battery cell close to a corresponding balancing resistor by using heat generated by the balancing resistor during performing cell balancing To this end, the balancing circuit 22 includes the resistors R1, R2, R3, and R4 and balancing switch devices Bsw1, Bsw2, Bsw3, and Bsw4, which are connected to each battery cell. In the embodiment shown in FIG. 2, one of the resistors R1, R2, R3, and R4 and one of the balancing switch devices Bsw1, Bsw2, Bsw3, and Bsw4 are connected to each battery cell.

Although FIG. 2 illustrates that each of the resistors R1, R2, R3, and R4 for cell balancing is one resistor, in another embodiment, each of the resistors R1, R2, R3, and R4 may include a plurality of resistors that are parallelly connected. For example, when a value of a resistor of FIG. 2 is 50 ohm, in another embodiment, the same circuit may be formed by parallelly connecting two 100-ohm resistors. The configuration of resistance may be performed by increasing or decreasing the number of resistors considering the heat generated during cell balancing.

In addition, the resistors R1, R2, R3, and R4 for cell balancing shown in FIG. 2 may be implemented on a printed circuit board (PCB) substrate close to the battery cells 10-1, 10-2, 10-3, and 10-4. In other words, each PCB substrate corresponding to the battery cells 10-1, 10-2, 10-3, and 10-4 may be provided between the battery cells and the resistors R1, R2, R3, and R4 arranged on the PCB.

Transistors, e.g., MOSFETs, or general switches, may be used as the balancing switch devices Bsw1, Bsw2, Bsw3, and Bsw4 of FIG. 2. The balancing switch devices may be turned on/off by receiving a signal from a switch device control unit 27 to be described below. When the balancing switch device is turned on, cell balancing is performed on a resistor that is serially connected to a corresponding switch device and, thus, a temperature of a corresponding battery cell may be increased.

Referring to FIG. 2, for example, when the switch device control unit 27 transmits a signal to perform cell balancing on the first resistor R1, the first switch Bsw1 is turned on and cell balancing is performed on the first resistor R1. In detail, when a temperature of a first battery cell is determined to be equal to or less than a predetermined reference value according to a value measured by the measurement circuit 21, the first balancing switch device Bsw1 is turned on, by a signal generated by the switch device control unit 27. When the first balancing switch device Bsw1 is turned on, cell balancing is performed using the first resistor R1. The temperature of the first battery cell 10-1 is increased by the heat generated from the first resistor R1.

Next, the voltage transfer circuit 23 receives voltage values of all battery cells 10-1, 10-2, 10-3, and 10-4 as input values and selectively outputs a voltage selected by a selection unit 25, in particular, a voltage of a battery cell needing cell balancing according to the present embodiment. Referring to FIG. 2, the voltage transfer circuit 23 includes a multiplexer (hereinafter, referred to as MUX) corresponding to each battery cell.

Each of MUXes 23-1, 23-2, 23-3, and 23-4 receives a voltage of a battery cell and outputs a voltage of a battery cell corresponding to the selection of a MUX control unit 26 to be described below. Thus, the MUXes 23-1, 23-2, 23-3, and 23-4 have the voltage values of the battery cells 10-1, 10-2, 10-3, and 10-4, and a selection value of a MUX control unit 26 as input values, and a voltage value of a selected battery cell as an output value.

Although FIG. 2 does not illustrate all connections, in the embodiment of FIG. 2, the MUXes 23-1, 23-2, 23-3, and 23-4 receive voltage values of the first through fourth battery cells 10-1, 10-2, 10-3, and 10-4 respectively at terminal IN1 through IN4. The voltage values of the first through fourth battery cells 10-1, 10-2, 10-3, and 10-4 are expressed by V1 through V4 and input values at the terminals IN1 through IN4 are expressed by V1 through V4, which clearly shows the above descriptions.

An identification number of a selected battery cell from the MUX control unit 26 may be input to terminals S1 and S2. For example, since the number of the battery cells 10-1, 10-2, 10-3, and 10-4 is four in the embodiment of FIG. 2, a signal for selectively selecting four different battery cells may be input to two input terminals S1 and S2.

The MUXes 23-1, 23-2, 23-3, and 23-4 output a voltage value of a selected battery cell. For example, when the MUX control unit 26 to be described below inputs signals to select the second battery cell 10-2 to the terminals S1 and S2, a voltage of the second battery cell 10-2 is output from an output terminal OUT. Also, MUXes 23-1, 23-2, 23-3, and 23-4 may output a reference voltage value from terminal Vref for cell balancing. For example, if the MUXes 23-1, 23-2, 23-3, and 23-4 output voltage value of V3 from the terminal OUT, an output value from the terminal Vref may be V4.

In addition, the balancing switch devices Bsw1, Bsw2, Bsw3, and Bsw4, connection switch devices Csw1, Csw2, Csw3, and Csw4, and transfer switch devices Tsw1, Tsw2, Tsw3, and Tsw4 are controlled by BMS 20 to perform cell balancing. In other words, the BMS 20 selects a battery cell whose voltage needs cell balancing and inputs a signal to select a battery cell to the MUXes 23-1, 23-2, 23-3, and 23-4, and controls the balancing switch devices Bsw1, Bsw2, Bsw3, and Bsw4, connection switch devices Csw1, Csw2, Csw3, and Csw4, and transfer switch devices Tsw1, Tsw2, Tsw3, and Tsw4, to perform cell balancing. Although FIG. 3 does not illustrate all connections for simplicity of illustration, all switch devices in a circuit receive a signal from the switch device control unit 27 of the BMS 20 for operation.

Figure 3:
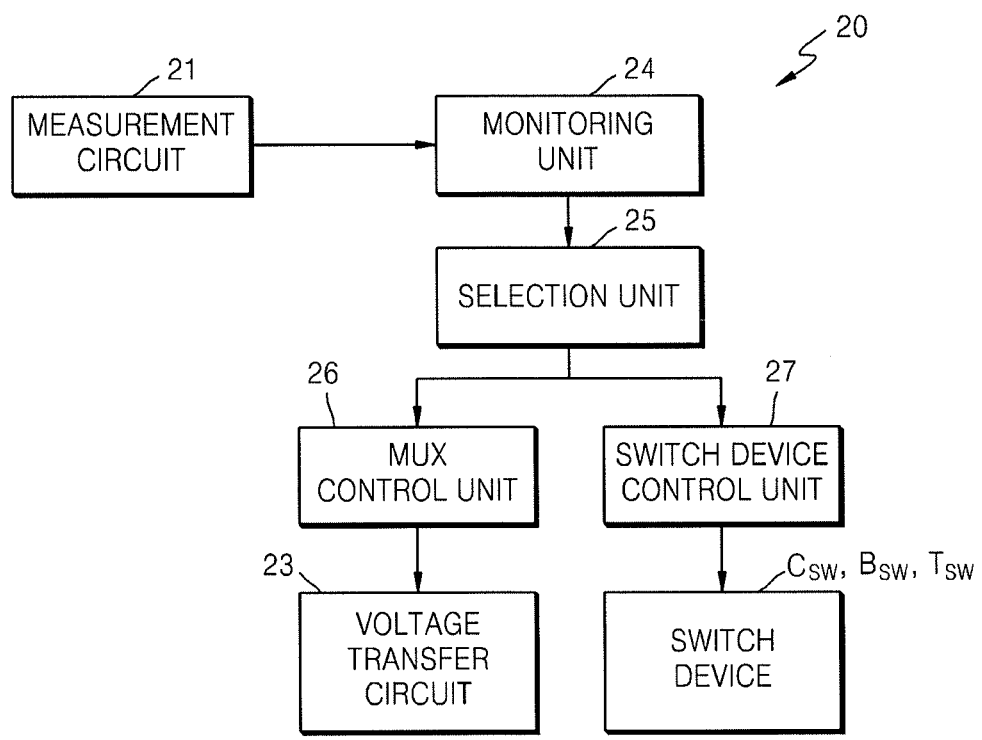
FIG. 3 illustrates a block diagram of a configuration of a BMS.

FIG. 3 is a block diagram illustrating a configuration of a BMS. Referring to FIG. 3, the BMS 20 further includes a monitoring unit 24, the selection unit 25, the MUX control unit 26, and the switch device control unit 27, in addition to the above-described circuit of FIG. 2.

First, the monitoring unit 24 receives temperature information and voltage information of each battery cell from the measurement circuit 21 and monitors a state of each battery cell. The monitoring unit 24 may monitor the state of a battery cell real time or in a predetermined time interval.

Next, the selection unit 25 selects a battery cell subject to cell balancing needing cell balancing and a resistor on which cell balancing is performed of the resistors in the circuit, based on information about the state of a battery cell obtained by the monitoring unit 24. Alternatively, the selection unit 25 selects a low temperature battery cell needing temperature increase. The selection unit 25 may compare a voltage value with other battery cells, or may use a preset value, to select a battery cell needing cell balancing.

In an example of the circuit of FIG. 2, the selection unit 25 may select the first battery cell 10-1 as a battery cell subject to cell balancing and may select the resistor R3 as a resistor on which cell balancing is performed. In this case, cell balancing is performed on the resistor R3 based on the voltage value of the first battery cell 10-1 output from the third MUX 23-3. In other words, since cell balancing may be performed on a resistor closer to another battery cell than that on which cell balancing is being performed according to the present embodiment, the selection unit 25 may independently select a battery cell subject to cell balancing and a resistor on which cell balancing is performed.

In detail, in the example of the circuit of FIG. 2, when the voltage of the first battery cell 10-1 is higher than the voltage of other battery cell as a result of the monitoring of a voltage and temperature of each battery cell by the monitoring unit 24, the selection unit 25 may select the first battery cell 10-1 as a battery cell subject to cell balancing. Also, when a temperature of the second battery cell 10-2 is lower than a reference value, cell balancing is performed by using the second resistor R2 corresponding to the second battery cell 10-2 and, thus, heat of the second battery cell 10-2 is increased by using the heat generated during cell balancing.

Next, the MUX control unit 26 receives a voltage of each battery cell and controls the MUX so that the MUXes 23-1, 23-2, 23-3, and 23-4 output a voltage of a battery cell that is determined as needing cell balancing by the selection unit 25. When the selection unit 25 of FIG. 2 refers to the states of the battery cells and it is assumed that the first battery cell 10-1 needs cell balancing and the temperature of the second battery cell 10-2 is equal to or less than a reference value, the operation of the MUX control unit 26 is described as follows. In this case, the MUX control unit 26 generates a signal to output the voltage of the first battery cell 10-1 at a terminal OUT by the second MUX 24-2.

As described above, the MUXes 23-1, 23-2, 23-3, and 23-4 of the voltage transfer circuit 23 may receive the voltage values of the battery cells 10-1, 10-2, 10-3, and 10-4 at the terminals IN1 through IN4 and output a voltage value of one battery cell according to a selection signal of the MUX control unit 26. In the above-described example, when the MUX control unit 26 inputs a signal to output the voltage of the first battery cell to the second MUX 24-2 to the terminals S1 and S2, the second MUX outputs a voltage value V1 of the first battery cell 10-1 from the terminal OUT. In addition, the second MUX 24-2 may output a voltage value V2 of the second battery cell 10-2 from the terminal Vref.

Next, the switch device control unit 27 generates a signal to control all switch devices included in the circuit of the BMS 20. As described above, the BMS 20 includes the balancing switch devices Bsw1, Bsw2, Bsw3, and Bsw4, the connection switch devices Csw1, Csw2, Csw3, and Csw4, and the transfer switch devices Tsw1, Tsw2, Tsw3, and Tsw4.

First, the switch device control unit 27 generates a signal to control the balancing switch devices Bsw1, Bsw2, Bsw3, and Bsw4. When the balancing switch devices Bsw1, Bsw2, Bsw3, and Bsw4 are turned on, the resistors R1, R2, R3, and R4 may perform cell balancing.

The switch device control unit 27 generates a signal to control the connection switch devices Csw1, Csw2, Csw3, and Csw4, and the transfer switch devices Tsw1, Tsw2, Tsw3, and Tsw4. The switch devices corresponding to the connection switch devices Csw1, Csw2, Csw3, and Csw4 and the transfer switch devices Tsw1, Tsw2, Tsw3, and Tsw4 have exclusive on/off values. In other words, when the first connection switch device Csw1 is turned on, the first transfer switch device Tsw1 is turned off, and vice versa. This is because, in the present embodiment, when the transfer switch devices Tsw1, Tsw2, Tsw3, and Tsw4 are turned on, cell balancing is performed by using a voltage of another battery cell transferred by the voltage transfer circuit 23, and when the connection switch devices Csw1, Csw2, Csw3, and Csw4 are turned on, the original battery cell close to the resistors R1, R2, R3, and R4 performs cell balancing.

In the present embodiment of FIG. 2, it is assumed that the selection unit 25 determines that the first battery cell 10-1 is a battery cell subject to cell balancing and a temperature of the second battery cell 10-2 is equal to or less than a reference value. In this case, the switch device control unit 27 transfers the voltage of the first battery cell 10-1 output by turning the second transfer switch device Tsw2 on and electrically isolates the second battery cell 10-2 and the balancing circuit 22 by turning the second connection switch device Csw2 off. Also, the switch device control unit 27 turns the second balancing switch device Bsw2 on to perform cell balancing on the resistor R2.

FIG. 4 is a flowchart according to a first embodiment. Referring to FIG. 4, a voltage of each battery cell is measured and monitored (S11). Next, a battery cell subject to cell balancing having a voltage value that is equal to or more than a preset reference value and a resistor on which cell balancing is performed are selected (S12). Next, the MUX connected to the resistor of S12 on which cell balancing is performed outputs a voltage value of the battery cell subject to cell balancing (S13). Next, the connection switch device connected to the battery cell of S12 is turned off and the transfer switch device and the balancing switch device connected to the resistor of S12 are turned on (S14). Finally, cell balancing is performed on the resistor (S15).

FIG. 5 is a flowchart according to a second embodiment. Referring to FIG. 5, a voltage and a temperature of each battery cell are measured and monitored (S21). Next, a battery cell subject to cell balancing needing cell balancing and a low temperature battery cell having a temperature that is equal to or less than a reference value are selected (S22). Next, a voltage value of a battery cell needing cell balancing is output from the MUX corresponding to the low temperature battery cell (S23). Next, the connection switch device connected to the low temperature battery cell is turned off and the transfer switch device and the balancing switch device connected to the MUX of S23 are turned on (S24). Finally, when a temperature of the low temperature battery cell increases over the reference value, the transfer switch device and the balancing switch device that were turned on (S24) are turned off (S25).

By way of summation and review, at least one embodiment is direct to increasing a temperature of a low temperature cell by transferring a voltage of a cell needing cell balancing to a cell having a low temperature by using a switch and discharging a voltage of the low temperature cell by using discharge resistance, in order to prevent degradation of stability of an energy storage system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for performing cell balancing for a battery pack, the method comprising:
  measuring a voltage of each of a plurality of battery cells in a battery pack;
  measuring a temperature of each of the plurality of battery cells;
  selecting one of the plurality of battery cells as a battery cell subject to cell balancing based on the measured voltages;
  selecting one of the plurality of battery cells as a low temperature battery cell;
  selecting one of a plurality of resistors as a resistor on which cell balancing is performed based on proximity to the low temperature battery cell; and
  outputting the voltage of the battery cell subject to cell balancing, through a multiplexer that receives the voltage of each of the plurality of battery cells, to the resistor on which cell balancing is performed.

2. The method as claimed in claim 1, further comprising:
  turning to an off state a connection switch device that is connected between the resistor on which cell balancing is performed and a corresponding one of the plurality of battery cells; and
  turning to an on state each of a transfer switch device and a balancing switch device that are connected between the resistor on which cell balancing is performed and the multiplexer.

3. The method as claimed in claim 2, wherein the voltage of the battery cell subject to cell balancing passes through the transfer switch device and the balancing switch device, to reach the resistor on which cell balancing is performed.

4. The method as claimed in claim 1, wherein:
  the resistor on which cell balancing is performed is selected based on monitoring information about the plurality of battery cells and each of the plurality of resistors corresponds to one of the plurality of battery cells, and
  the voltage of the battery cell subject to cell balancing being equal to or greater than a reference voltage value.

5. The method as claimed in claim 1, wherein:
  the multiplexer having the voltage of each of the plurality of battery cells applied thereto is a selected multiplexer from among a plurality of multiplexers, the selected multiplexer being selected based on the selecting of the resistor on which cell balancing is performed and independently of the selection of the battery cell subject to cell balancing, and
  outputting the voltage of the battery cell subject to cell balancing includes sending a selection signal to the selected multiplexer.

6. The method as claimed in claim 1, wherein each of the plurality of resistors corresponds to one of the plurality of battery cells such that the resistor on which cell balancing is performed corresponds to the low temperature battery cell.

7. The method as claimed in claim 6, further comprising:

turning to an off state a connection switch device connected between the resistor on which cell balancing is performed and a corresponding one of the plurality of battery cells; and turning to an on state each of a transfer switch device and a balancing switch device connected between the resistor on which cell balancing is performed and the multiplexer connected to the resistor on which cell balancing is performed such that the voltage of the battery cell subject to cell balancing is output to the resistor corresponding to the low temperature battery cell.

8. The method as claimed in claim 7, further comprising turning each of the transfer switch device and the balancing switch device to an off state when the temperature of the low temperature battery cell is greater than a reference temperature value.

9. An energy storage system, comprising:
a battery pack including a plurality of battery cells; and
a battery management system connected to the battery pack, the battery management system including:
a measurement circuit that measures a voltage of each of the battery cells and a temperature of each of the battery cells;
a balancing circuit that includes a plurality of resistors;
a selector that selects one of the plurality of battery cells as a battery cell subject to cell balancing and that selects one of the plurality of battery cells as a low temperature battery cell and selects one of the plurality of resistors as a resistor on which cell balancing is performed via a connection switch device based on proximity to the low temperature battery cell; and
a voltage transfer circuit that includes a multiplexer connected to the resistor on which cell balancing is performed, the multiplexer having inputs for the voltage of each of the battery cells such that the voltage of the battery cell subject to cell balancing is output, through the multiplexer, to the resistor on which cell balancing is performed.

10. The energy storage system as claimed in claim 9, wherein the multiplexer in the voltage transfer circuit is one of a plurality of multiplexers such that each of the resistors in the balancing circuit corresponds to and is connected to one of the plurality of multiplexers in the voltage transfer circuit.

11. The energy storage system as claimed in claim 10, wherein:
the battery management system includes a plurality of connection switch devices, each connection switch device being connected between one of the plurality of resistors and a corresponding one of the plurality of battery cells,
the balancing circuit includes a plurality of balancing switch devices, each balancing switch device being connected between one of the plurality of resistors and a corresponding one of the plurality of multiplexers, and
the voltage transfer circuit includes a plurality of transfer switch devices, each of the transfer switch devices being connected between one of the plurality of multiplexers and the balancing circuit.

12. The energy storage system as claimed in claim 11, wherein:
the battery management system includes a switch device controller that controls the plurality of connection switch devices, the plurality of balancing switch devices, and the plurality of transfer switch devices, and
when the voltage of the battery cell subject to cell balancing is output from the multiplexer that corresponds to the resistor on which cell balancing is performed, one of the plurality of connection switch devices that is between the resistor on which cell balancing is performed and the corresponding one of the plurality of battery cells is in an off state.

13. The energy storage system as claimed in claim 12, wherein, when the voltage of the battery cell subject to cell balancing is output from the multiplexer that corresponds to the resistor on which cell balancing is performed, one of the plurality of transfer switch devices and one of the plurality of balancing switch devices between the resistor on which cell balancing is performed and the corresponding one of the plurality of battery cells are in an on state.

14. The energy storage system as claimed in claim 9, wherein:
the multiplexer in the voltage transfer circuit is one of a plurality of multiplexers such that each of the resistors corresponds to one of the plurality of multiplexers and corresponds to one of the plurality of battery cells, and
the battery management system includes a multiplexer controller that controls the plurality of multiplexers based on selection by the selector.

15. The energy storage system as claimed in claim 14, wherein the multiplexer controller determines which of the plurality of multiplexers outputs the voltage of the battery cell subject to cell balancing based on which of the plurality of resistors is selected by the selector as the resistor on which cell balancing is performed.

16. The energy storage system as claimed in claim 14, wherein:
the multiplexer controller controls one of the plurality of multiplexers corresponding to the low temperature battery cell to output the voltage of the battery cell subject to cell balancing.

17. The energy storage system as claimed in claim 9, wherein:
the battery management system includes a monitor that receives voltage information that includes the voltage of each of the battery cells and temperature information that includes the temperature of each of the battery cells from the measurement circuit, and
the monitor provides the information to the selector, the selector independently selects the battery cell subject to cell balancing based on the voltage information and selects the resistor on which cell balancing is performed based on the temperature information.

18. The energy storage system as claimed in claim 9, wherein:
the battery management system includes a monitor that receives voltage information that includes the voltage of each of the battery cells, and
the monitor provides the voltage information to the selector, the selector selects the battery cell subject to cell balancing based on the voltage information and selects the resistor on which cell balancing is performed independently of the voltage information.

* * * * *